(12) United States Patent
Koyama et al.

(10) Patent No.: US 11,973,397 B2
(45) Date of Patent: Apr. 30, 2024

(54) DYNAMO-ELECTRIC MACHINE

(71) Applicant: Hitachi Industrial Products, Ltd., Tokyo (JP)

(72) Inventors: Takayuki Koyama, Tokyo (JP); Kenichi Sugimoto, Tokyo (JP)

(73) Assignee: HITACHI INDUSTRIAL PRODUCTS, LTD., Tokyo (JP)

( * ) Notice: Subject to any disclaimer, the term of this patent is extended or adjusted under 35 U.S.C. 154(b) by 415 days.

(21) Appl. No.: 17/299,028

(22) PCT Filed: Jan. 15, 2020

(86) PCT No.: PCT/JP2020/001055
§ 371 (c)(1),
(2) Date: Jun. 2, 2021

(87) PCT Pub. No.: WO2020/158389
PCT Pub. Date: Aug. 6, 2020

(65) Prior Publication Data
US 2022/0037952 A1 Feb. 3, 2022

(30) Foreign Application Priority Data
Jan. 29, 2019 (JP) .................. 2019-012780

(51) Int. Cl.
*H02K 5/16* (2006.01)
*H02K 5/20* (2006.01)
(Continued)

(52) U.S. Cl.
CPC .............. *H02K 5/16* (2013.01); *H02K 5/207* (2021.01); *H02K 5/22* (2013.01); *H02K 5/24* (2013.01); *H02K 15/00* (2013.01)

(58) Field of Classification Search
CPC  H02K 5/16; H02K 5/207; H02K 5/22; H02K 5/24; H02K 15/00
See application file for complete search history.

(56) References Cited

FOREIGN PATENT DOCUMENTS

| JP | H-09233761 A | * | 9/1997 |
|---|---|---|---|
| JP | 2002-051503 A | | 2/2002 |

(Continued)

OTHER PUBLICATIONS

JP-2002051503-A_translate (Year: 2002).*

(Continued)

*Primary Examiner* — Tulsidas C Patel
*Assistant Examiner* — Mohammed Ahmed Qureshi
(74) *Attorney, Agent, or Firm* — MATTINGLY & MALUR, PC

(57) ABSTRACT

A dynamo-electric machine which inhibits the vibration of a frame and a bearing and has excellent manufacturability. A dynamo-electric machine according to the present invention includes a stator, a rotor including a rotary shaft and being disposed on an inner side in a radial direction of the stator, a bearing for supporting the rotary shaft, an intermediate frame for supporting the stator, and a stator frame for supporting the bearing and the intermediate frame. The stator frame includes pedestals at two end portions in a width direction of a bottom portion of the stator frame. Each of the pedestals includes an upper surface positioned above a bottom surface of the stator frame. The intermediate frame is fixed to upper surfaces of the pedestals.

4 Claims, 7 Drawing Sheets

(51) Int. Cl.
　　　*H02K 5/22*　　　　(2006.01)
　　　*H02K 5/24*　　　　(2006.01)
　　　*H02K 15/00*　　　(2006.01)

(56) References Cited

FOREIGN PATENT DOCUMENTS

| JP | 2002051503 A | * | 2/2002 | |
|---|---|---|---|---|
| JP | 2013-150383 A | | 8/2013 | |
| JP | 2013150383 A | * | 8/2013 | |
| JP | 2016-093012 A | | 5/2016 | |
| JP | 2017-216774 A | | 12/2017 | |
| WO | WO-2018047515 A1 | * | 3/2018 | ............... H02K 5/20 |

OTHER PUBLICATIONS

JP-2013150383-A_translate (Year: 2013).*
WO-2018047515-A1_translate (Year: 2018).*
JPH-09233761-A_translate (Year: 1997).*
International Search Report of PCT/JP2020/001055 dated Apr. 7, 2020.

* cited by examiner

DYNAMO-ELECTRIC MACHINE

TECHNICAL FIELD OF THE INVENTION

The present invention relates to a dynamo-electric machine.

BACKGROUND ART

A dynamo-electric machine includes a stator, a rotor, a frame for holding the stator, and a bearing for supporting a rotary shaft of the rotor. In the dynamo-electric machine, the stator is deformed by the magnetic attractive force caused during operation, which causes electromagnetic vibration. The electromagnetic vibration is known to be vibrated at a frequency twice the frequency of a power supply, and is propagated from the stator to the frame and the bearing. The rotor is vibrated with respect to the rotary shaft due to the unbalance in the configuration that the rotor has. The vibration of the rotor vibrates the frame and the bearing. Thus, vibration having the rotation frequency components appears in the frame and the bearing.

Consequently, the conventional dynamo-electric machine has a problem that the electromagnetic vibration and the vibration of the rotation frequency components are generated in the frame and the bearing.

Document 1 discloses an example of the conventional dynamo-electric machine. The dynamo-electric machine disclosed in Document 1 includes cutouts on both sides of a stator supporting member, the cutouts lowering the rigidity of the stator supporting member to increase the flexibility, thereby lowering the electromagnetic vibration.

DOCUMENT LIST

Patent Document

DOCUMENT 1: JP 2016-093012

SUMMARY OF INVENTION

Technical Problem

In the dynamo-electric machine disclosed in Document 1, the stator is resiliently supported by the stator supporting member including the cutouts. Consequently, the dynamo-electric machine disclosed in Document 1 has difficulty in adjusting the size of the gap between the rotor and the stator and in adjusting the rigidity of the stator supporting member, which cause a problem in the manufacturability of the dynamo-electric machine. In addition, the dynamo-electric machine disclosed in Document 1 has difficulty in inhibiting the vibration of the stator itself and has a problem that the vibration of the stator is propagated to the frame and the bearing.

An object of the present invention is to provide a dynamo-electric machine which inhibits the vibration of a frame and a bearing and has excellent manufacturability.

Solution to Problem

A dynamo-electric machine according to the present invention includes a stator, a rotor including a rotary shaft and being disposed on an inner side in a radial direction of the stator, a bearing for supporting the rotary shaft, an intermediate frame for supporting the stator, and a stator frame for supporting the bearing and the intermediate frame. The stator frame includes pedestals at two end portions in a width direction of a bottom portion of the stator frame. Each of the pedestals includes an upper surface positioned above a bottom surface of the stator frame. The intermediate frame is fixed to upper surfaces of the pedestals.

Advantageous Effects of Invention

According to the present invention, it is possible to provide a dynamo-electric machine which inhibits the vibration of the frame and the bearing and has excellent manufacturability.

DESCRIPTION OF EMBODIMENTS

A dynamo-electric machine according to the present invention has features to inhibit the vibration of a frame and a bearing caused by the vibration of a stator, have low vibration, and have excellent manufacturability (or be easily manufactured). One of factors of the bearing vibration is that the vibration of the frame is propagated to the bearing.

The dynamo-electric machine according to embodiments of the present invention will be described below with reference to the drawings. Hereinafter, the direction parallel to a rotary shaft of a rotor is called the "axial direction", and the direction perpendicular to the axial direction and the height direction of the dynamo-electric machine is called the "width direction". The direction around the rotary shaft is called the "circumferential direction", and the direction of the radius of the rotary shaft is called the "radial direction".

Embodiment 1

Figure 1:
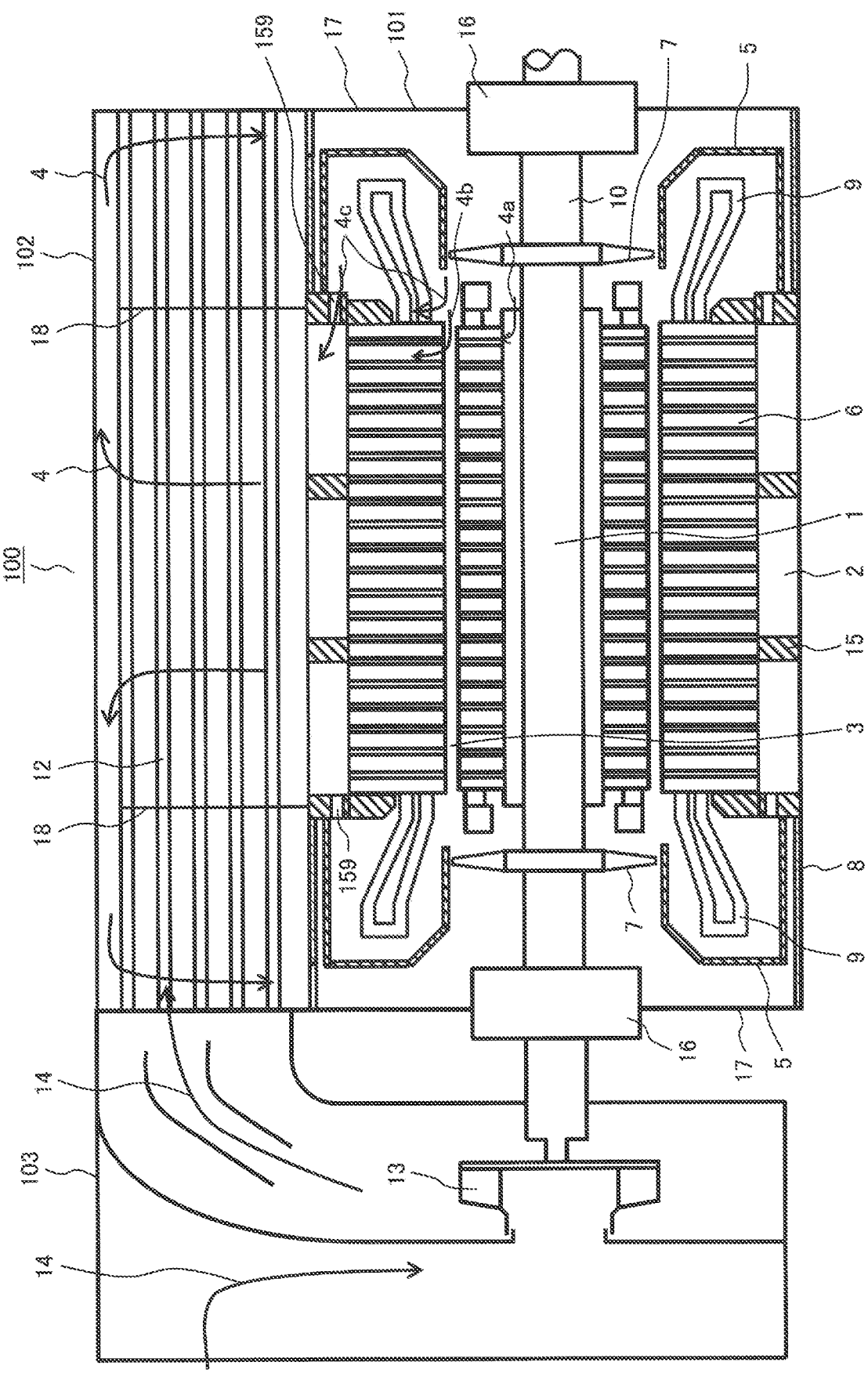
FIG. 1 is a schematic diagram illustrating a configuration of a dynamo-electric machine according to embodiment 1 of the present invention.

FIG. 1 is a schematic diagram illustrating a configuration of a dynamo-electric machine according to embodiment 1 of the present invention, and illustrates a cross section through the rotary shaft.

A dynamo-electric machine 100 includes a dynamo-electric machine main body 101, a heat exchanger 102 for cooling internal air 4 circulated through the interior of the dynamo-electric machine main body 101, and an external fan duct 103 for introducing external air 14 into the heat exchanger 102.

The dynamo-electric machine main body 101 includes a stator 2 in cylindrical shape, a rotor 1, an intermediate frame 15, a stator frame 8, axial flow fans 7, and bearings 16. The rotor 1 is disposed on the inner side in the radial direction of the stator 2 through an air gap 3, and includes a rotary shaft 10. The rotor shaft 10 has one end portion (the right side in FIG. 1) connected to a coupling (not illustrated). The intermediate frame 15 supports the stator 2. The stator frame 8 supports the intermediate frame 15, and includes brackets 17 at the two end portions in the axial direction of the stator frame 8. The axial flow fans 7 are installed at the two end portions of the rotary shaft 10, and circulate the internal air 4 whose heat has been removed by the heat exchanger 102 to the interior of the dynamo-electric machine main body 101. The bearings 16 are supported by the brackets 17, and support the rotor 1 at the rotary shaft 10. The two end portions of the rotary shaft 10 are supported by the bearings 16.

The heat exchanger 102 includes a pipe group 12 in which the external air 14 is circulated through the interior of the heat exchanger 102, and removes the heat from the internal air 4 which has cooled the stator 2 and the rotor 1. The heat exchanger 102 includes, at the two end portions in the axial direction, partition plates 18 for controlling the flow of the internal air 4.

The external fan duct 103 accommodates an external fan 13. The external fan 13 is an air blower, is connected to the other end portion of the rotary shaft 10, and sends the external air 14 into the heat exchanger 102.

The stator 2 includes a stator core 6, guide plates 5, and a stator coil (not illustrated) accommodated in plural slots (not illustrated) formed on the inner radius side of the stator core 6. The stator coil includes stator coil end portions 9 which are protruded from the end portions of the stator core 6 to the outside in the axial direction. The guide plates 5 are mounted at the two end portions in the axial direction of the intermediate frame 15 with bolts so as to cover the stator coil end portions 9.

The configuration of the cooling of the dynamo-electric machine 100 by the ventilation will be described below.

The internal air 4 which has been increased in pressure by the axial flow fans 7 is divided into internal air 4a flowing toward the interior of the rotor 1, internal air 4b flowing toward the air gap 3, and internal air 4c flowing toward the stator coil end portions 9. The internal air 4a flowing toward the interior of the rotor 1 cools the rotor 1, and then flows to the air gap 3. The internal air 4b flowing toward the air gap 3 is joined to the internal air 4a flowing to the air gap 3 to cool the stator 2, and is flowed into the stator frame 8. The internal air 4c flowing toward the stator coil end portions 9 cools the stator coil end portions 9, passing through opening portions 159 of main plates included in the intermediate frame 15 to flow into the stator frame 8, and joining the internal airs 4a and 4b.

The internal air 4 in which the internal airs 4a, 4b, and 4c have been joined flows out from the outer periphery of the stator frame 8 into the heat exchanger 102, where the heat of the internal air 4 is removed in region between two partition plates 18. The internal air 4 is then cooled and is returned to the axial flow fans 7.

The heat exchanger 102 includes the pipe group 12 configured of plural pipes therein, and cools the internal air 4. The external air 14 which is a secondary refrigerant is flowed into the interior of the pipe group 12 by the external fan 13. When passing through between the pipes of the pipe group 12 in the interior of the heat exchanger 102, the internal air 4 is cooled by exchanging the heat with the external air 14 in the pipes through the pipe walls.

Figure 2:
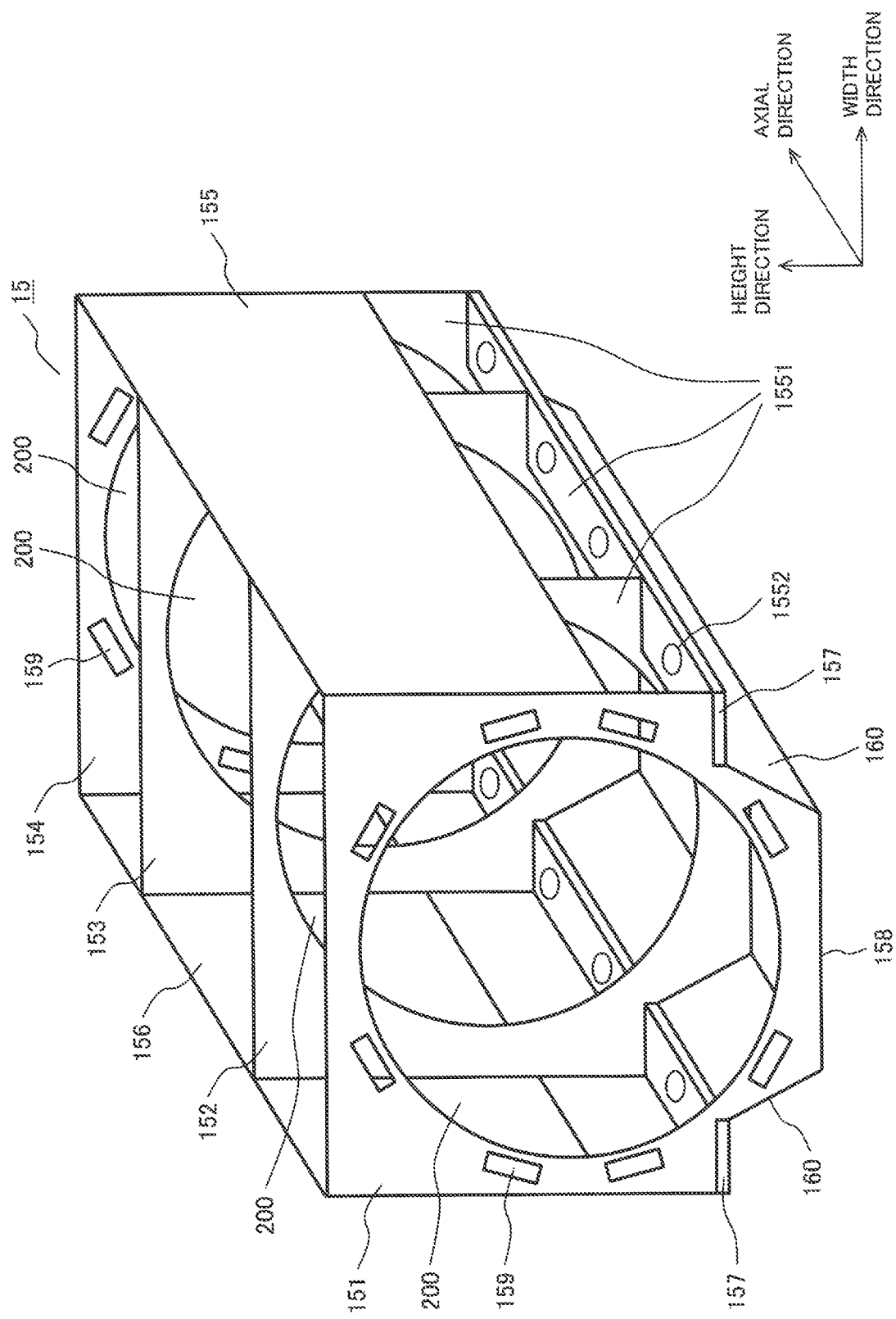
FIG. 2 is a diagram illustrating an example of the configuration of an intermediate frame.

FIG. 2 is a diagram illustrating an example of the configuration of the intermediate frame 15.

The intermediate frame 15 includes a main plate 151 and a main plate 154 at the two end portions in the axial direction, and includes an intermediate plate 152 and an intermediate plate 153 between the main plate 151 and the main plate 154 along the axial direction. The main plates 151, 154 and the intermediate plates 152, 153 are surfaces which include opening portions 200 in circular shape for supporting the stator 2 at the center portions of the plates 151-154. The main plates 151 and 154 include the plural opening portions 159 for passing through the internal air 4c which has cooled the stator coil end portions 9 as illustrated in FIG. 1. The opening portions 159 are provided around the opening portion 200 for supporting the stator 2.

As described with reference to FIG. 1, the opening portions 159 are provided for cooling the internal air 4 in the region between the two partition plates 18 of the heat exchanger 102. The opening portions 159 are provided in the main plates 151 and 154 preferably to be aligned at equal intervals in the circumferential direction.

The intermediate frame 15 includes a side plate 155 and a side plate 156 at the two end portions in the width direction. The side plate 155 and the side plate 156 connect the main plate 151, the intermediate plate 152, the intermediate plate 153, and the main plate 154 to each other. Below each of the side plates 155 and 156, opening portions 1551 are provided.

The intermediate frame 15 includes a bottom portion in downward-protruding shape. The intermediate frame 15 includes, in the bottom portion of the intermediate frame 15, a bottom plate 158 which is a surface positioned at the center portion in the width direction, leg plates 157 which are two surfaces positioned at the two end portions in the width direction, and side plates 160 which are two surfaces connecting the bottom plate 158 and the leg plates 157.

The leg plates 157 are positioned above the bottom plate 158, and are fixed to the stator frame 8. The leg plates 157 include plural through holes 1552, and are fixed to the stator frame 8 with the bolts penetrated through the through holes 1552.

The opening portions 1551 are provided for a work to fix the leg plates 157 of the intermediate frame 15 to the stator frame 8 with the bolts.

Figure 3:
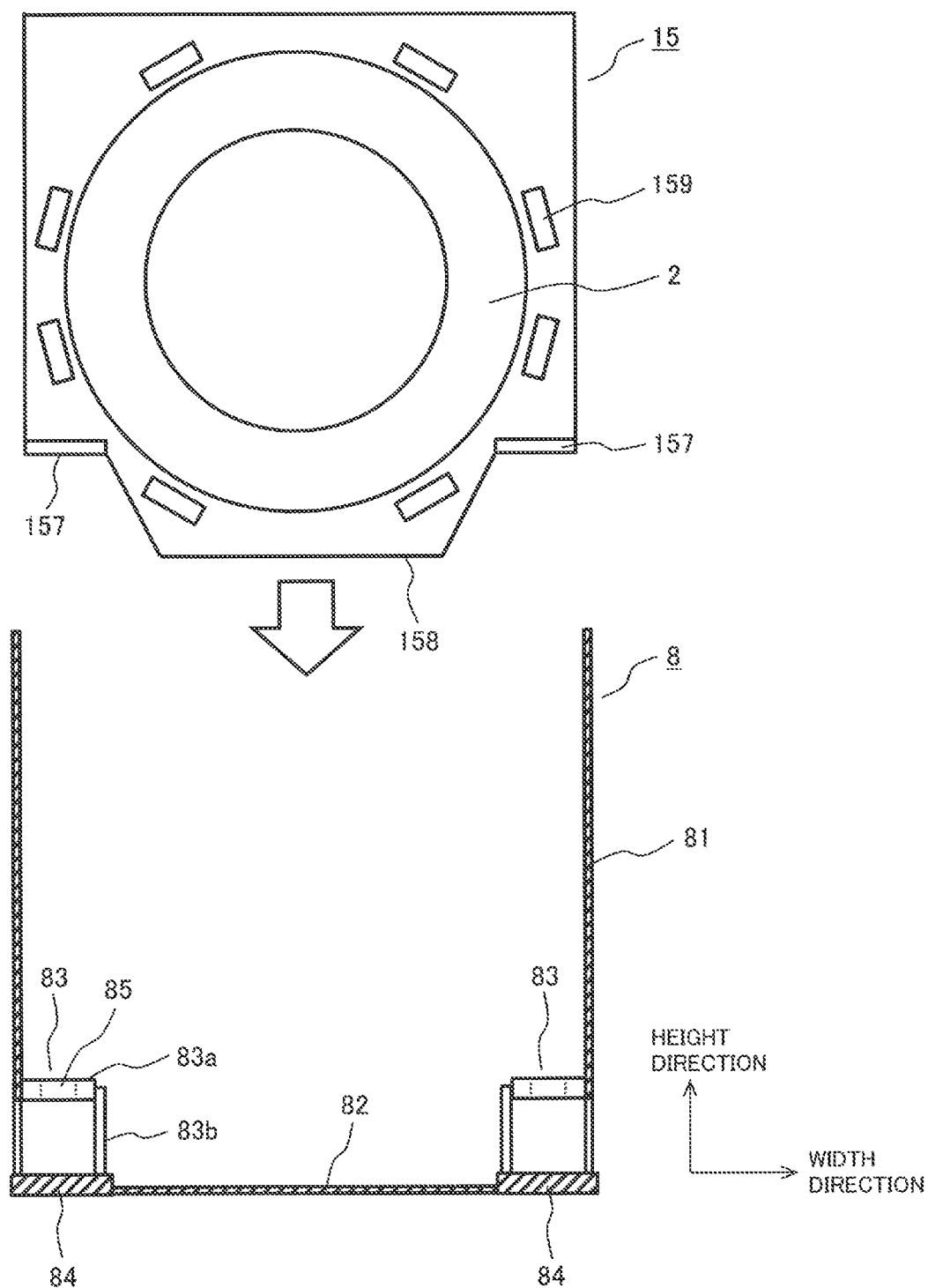
FIG. 3 is a diagram illustrating an example of the configuration of a stator frame and the intermediate frame to be fixed to the stator frame.

FIG. 3 is a diagram illustrating an example of the configuration of the stator frame 8 and the intermediate frame 15 to be fixed to the stator frame 8. FIG. 3 is a cross-sectional view of the stator frame 8 and the intermediate frame 15, perpendicular to the axial direction.

The stator frame 8 includes main plates (not illustrated in FIG. 3) at the two end portions in the axial direction, and includes side plates 81 at the two end portions in the width direction.

The stator frame 8 includes a bottom plate 82, leg plates 84, and pedestals 83 at the bottom portion. The bottom plate 82 is the bottom surface of the stator frame 8, and is placed on the base of the dynamo-electric machine 100. The leg plates 84 are provided at the two end portions of the bottom plate 82 in the width direction, and include plural through holes (not illustrated). Bolts for fixing the stator frame 8 to the base of the dynamo-electric machine 100 are penetrated through the through holes. The dynamo-electric machine 100 is fixed to the base with the bolts penetrating through the leg plates 84. The pedestals 83 are provided at the two end portions of the stator frame 8 in the width direction, and are installed on the leg plates 84.

Each of the pedestals 83, configured of a steel plate, includes an upper surface 83a parallel to the bottom plate 82 and a side surface 83b perpendicular to the bottom plate 82, and is extended in the axial direction. The upper surface 83a is a planar surface portion positioned above the bottom surface (bottom plate 82) of the stator frame 8, and is connected to the side plate 81 and the side surface 83b. The side surface 83b is connected to the leg plate 84 and the upper surface 83a. The pedestal 83 is fixed to the side plate 81 and the leg plate 84 by welding. The upper surface 83a includes one or plural bolt holes 85.

The stator frame 8 may include, at each of the two end portions in the width direction of the stator frame 8, one pedestal 83 or plural pedestals 83 aligned in the axial direction. In a configuration in which the stator frame 8 includes one pedestal 83 at each of the two end portions in the width direction, the pedestal 83 can be extended over substantially the entire length of the stator frame 8 in the axial direction.

The intermediate frame 15 is fixed to the stator frame 8. The intermediate frame 15 supports the stator 2 at the opening portions 200 in circular shape included in the main plate 151, the intermediate plate 152, the intermediate plate 153, and the main plate 154 (see FIG. 2). When fixed to the stator frame 8, the intermediate frame 15 is coupled to and integrated with the stator 2 by, for example, shrink fitting and the like.

As indicated with the arrow in FIG. 3, the intermediate frame 15 is inserted from the upper portion of the stator frame 8 into the interior of the stator frame 8, and is accommodated in the stator frame 8 to be fixed. The leg plates 157 of the intermediate frame 15 are installed on the upper surfaces 83a of the pedestals 83. The intermediate frame 15 and the stator frame 8 are fixed to each other with bolts penetrated through the through holes 1552 of the leg plates 157 (see FIG. 2) and the bolt holes 85 of the upper surfaces 83a. In this way, the intermediate frame 15 can be easily mounted on the stator frame 8.

It should be noted that the bottom plate 158 of the intermediate frame 15 is not in contact with the bottom plate 82 which is the bottom surface of the stator frame 8.

The side plate 81 of the stator frame 8 includes opening portions (not illustrated) for performing the operation of fixing the intermediate frame 15 to the stator frame 8 with bolts. After the intermediate frame 15 is fixed to the stator frame 8 with the bolts, the opening portions are covered with covers to be closed.

Figure 4:
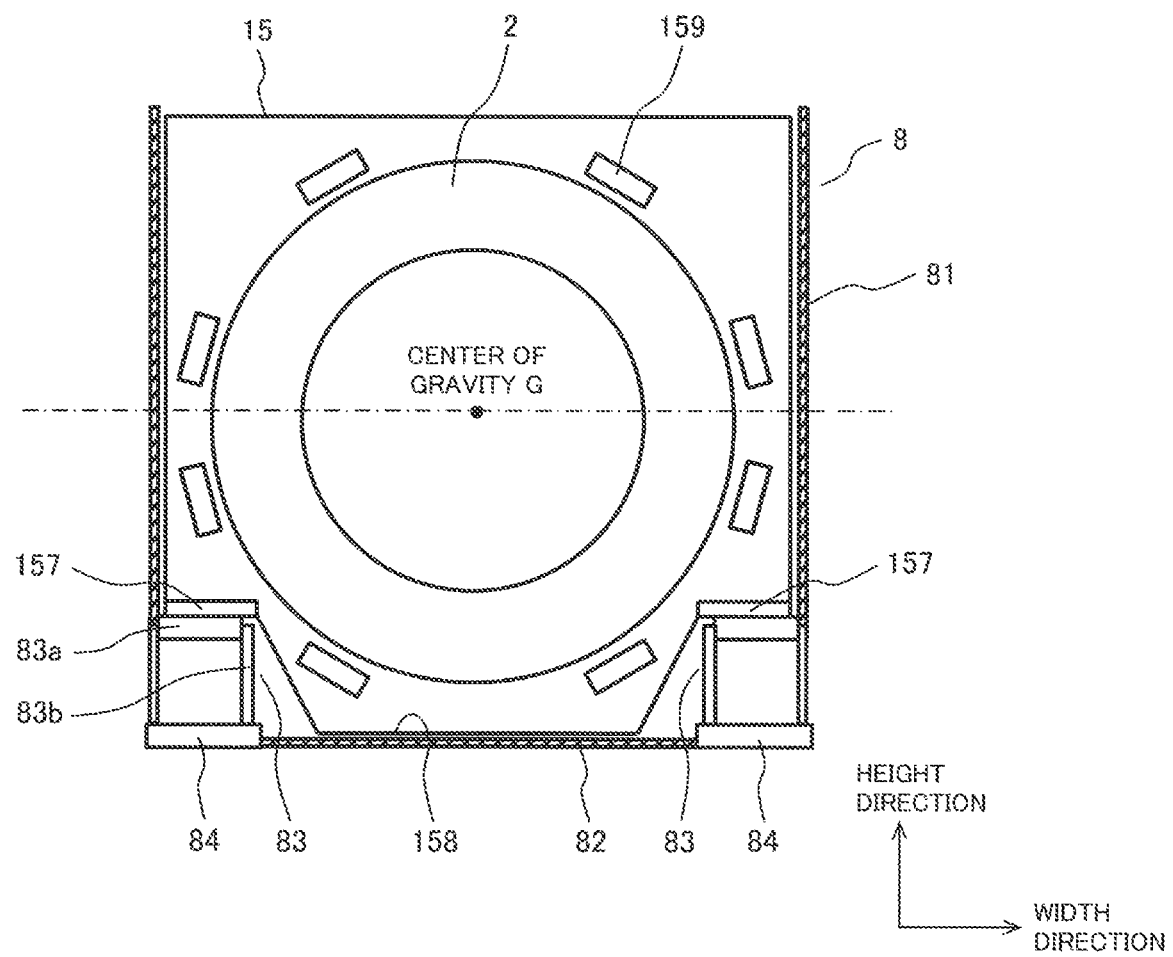
FIG. 4 is a diagram illustrating the stator frame and the intermediate frame fixed to the stator frame.

FIG. 4 is a diagram illustrating the stator frame 8 and the intermediate frame 15 fixed to the stator frame 8, and is a cross-sectional view perpendicular to the axial direction of the stator frame 8 and the intermediate frame 15. The intermediate frame 15 supports the stator 2.

As described above, the leg plates 157 of the intermediate frame 15 are installed on the upper surfaces 83a of the pedestals 83 of the stator frame 8, and the bottom plate 158 of the intermediate frame 15 is not in contact with the bottom plate 82 of the stator frame 8. The upper surfaces 83a of the pedestals 83 are positioned above the bottom surface (bottom plate 82) of the stator frame 8.

Since the intermediate frame 15 which supports the stator 2 is installed on the pedestals 83, the intermediate frame 15 is supported by the stator frame 8 at a position where the height-direction position of the intermediate frame 15 is close to the position of the center of gravity G of the stator 2. The position in the height direction of the center of gravity G of the stator 2 is substantially equal to the position in the height direction of the center of the rotary shaft 10. With the configuration of this embodiment in which the intermediate frame 15 is supported by the stator frame 8 (the upper surfaces 83a of the pedestals 83) at a height-direction position close to the center of gravity G of the stator 2, the displacement of the intermediate frame 15 is small with respect to the vibration (in particular, the vibration in the width direction) of the stator 2, so that the vibration of the intermediate frame 15 is inhibited.

Here, a dynamo-electric machine with a configuration that the stator frame 8 does not include the pedestals 83 will be described.

Figure 5:
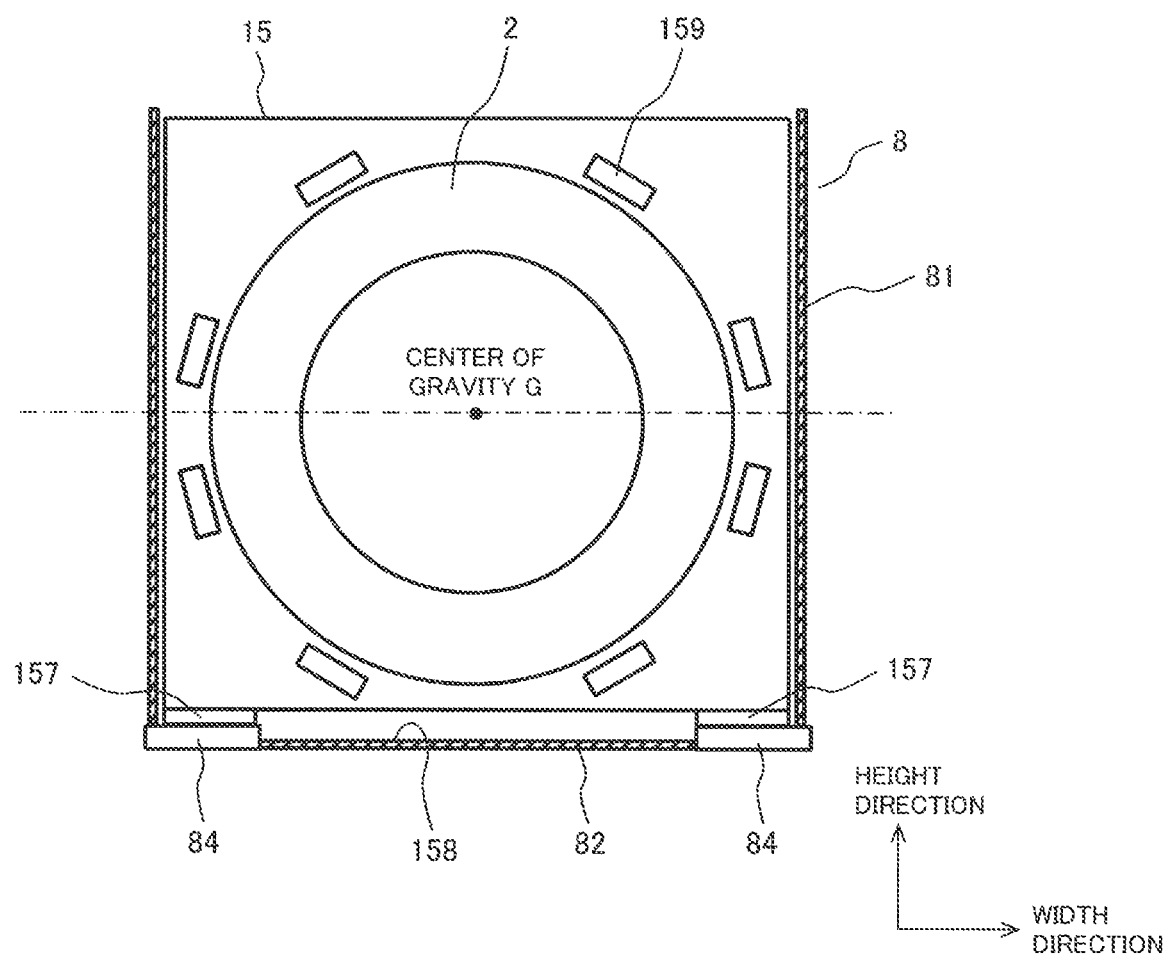
FIG. 5 is a diagram illustrating the stator frame and the intermediate frame fixed to the stator frame in a dynamo-electric machine which has a configuration that the stator frame does not include pedestals.

FIG. 5 is a diagram illustrating the stator frame 8 and the intermediate frame 15 fixed to the stator frame 8, as in FIG. 4, in a dynamo-electric machine which has a configuration that the stator frame 8 does not include the pedestals 83. The leg plates 157 are fixed to the leg plates 84 of the stator frame 8 with bolts or by welding, so that the intermediate frame 15 is fixed to the stator frame 8. In the configuration illustrated in FIG. 5, the intermediate frame 15 is supported by the stator frame 8 at a position where the height-direction position of the intermediate frame 15 is far from the position of the center of gravity G of the stator 2.

As illustrated in FIG. 4, in the dynamo-electric machine 100 according to this embodiment, the intermediate frame 15 is supported by the stator frame 8 at a position where the height-direction position of the intermediate frame 15 is close to the position of the center of gravity G of the stator 2. Thus, in the dynamo-electric machine 100 according to this embodiment, as compared with the dynamo-electric machine with the configuration illustrated in FIG. 5, the displacement of the intermediate frame 15 is smaller even when the stator 2 is vibrated, so that the vibration of the intermediate frame 15 is inhibited.

The electromagnetic force generated by the dynamo-electric machine 100 during operation vibrates the stator 2 in the radial direction, thereby vibrating the intermediate frame 15 in the radial direction. As described above, in the dynamo-electric machine 100 according to this embodiment, the electromagnetic vibration (in particular, the electromagnetic vibration in the width direction) of the intermediate frame 15 is inhibited.

Further, the bottom plate 158 of the intermediate frame 15 is not in contact with the stator frame 8, and the intermediate frame 15 and the stator frame 8 are in contact with each other at only the leg plates 157 and the pedestals 83. Between the intermediate frame 15 and the stator frame 8, there is a gap in the portion other than the portion in which the intermediate frame 15 and the stator frame 8 are in contact with each other at the leg plates 157 and the pedestals 83. That is, the intermediate frame 15 is not in contact with the bottom plate 82 of the stator frame 8 and is in contact with the stator frame 8 at only the pedestals 83. With this configuration, the vibration directly propagated from the intermediate frame 15 to the stator frame 8 is small.

The dynamo-electric machine 100 according to this embodiment can inhibit the vibration of the intermediate frame 15 and also inhibit the vibration propagated from the intermediate frame 15 to the stator frame 8. Thus, the dynamo-electric machine 100 according to this embodiment can inhibit the vibration of the intermediate frame 15 and the stator frame 8, and also can inhibit the vibration of the bearings 16 propagated from the stator frame 8.

As illustrated in FIG. 2, the opening portions 159 included in the main plates 151 and 154 of the intermediate frame 15 are configured of the holes provided in the main plates 151 and 154. The opening portions 159 can also be configured of cutouts opened toward the opening portions 200 for supporting the stator 2. That is, the opening portions 159 can also be configured of the cutouts opened toward the stator 2.

Figure 6:
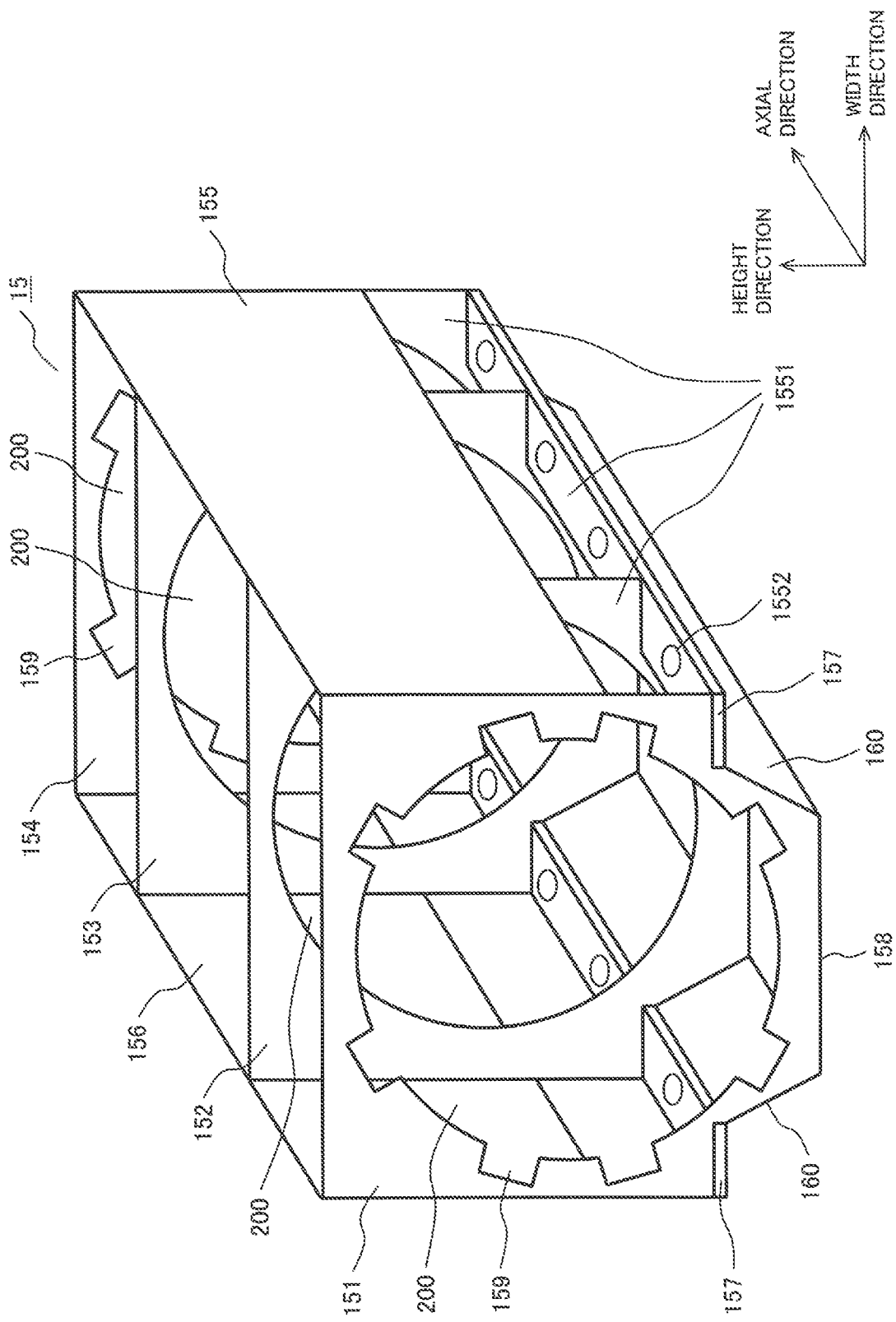
FIG. 6 is a diagram illustrating a configuration of the intermediate frame which includes, as opening portions, cutouts opened toward a stator.

FIG. 6 is a diagram illustrating a configuration of the intermediate frame 15 which includes, as the opening portions 159, the cutouts opened toward the stator 2. The opening portions 159 included in the main plates 151 and 154 of the intermediate frame 15 are configured of the cutouts provided in the main plates 151 and 154. The cutouts are opened toward the stator 2 (the opening portions 200 for supporting the stator 2).

As described above, the dynamo-electric machine 100 according to this embodiment inhibits the vibration of the intermediate frame 15, the stator frame 8, and the bearings 16.

Further, in the dynamo-electric machine 100 according to this embodiment, since the bottom plate 158 of the intermediate frame 15 is not in contact with the stator frame 8 and the stator frame 8 fixes the intermediate frame 15 at only the pedestals 83, the bottom plate 158 of the intermediate frame 15 is not required to be fixed to the stator frame 8, so that the dynamo-electric machine 100 has an advantage that the manufacturability is excellent. In addition, the dynamo-electric machine 100 according to this embodiment also has an advantage that the position in the height direction of the stator 2 is easily determined since the intermediate frame 15 is supported at only the pedestals 83 of the stator frame 8. The position in the height direction of the stator 2 can be adjusted when the intermediate frame 15 is fixed to the pedestals 83. Thus, in the dynamo-electric machine 100 according to this embodiment, an adjustment of the size of the gap between the rotor 1 and the stator 2 is easily performed. Moreover, in the dynamo-electric machine 100 according to this embodiment, since the bottom surface of the stator frame 8 does not have a downward-protruding shape, the base of the dynamo-electric machine 100 is not required to have a downward-protruding shape, so that the base construction is easily performed and the dynamo-electric machine 100 is easily installed on the base. In this way, the dynamo-electric machine 100 according to this embodiment has an advantage that the manufacturability is excellent.

Embodiment 2

The dynamo-electric machine 100 according to embodiment 2 of the present invention will be described.

Figure 7:
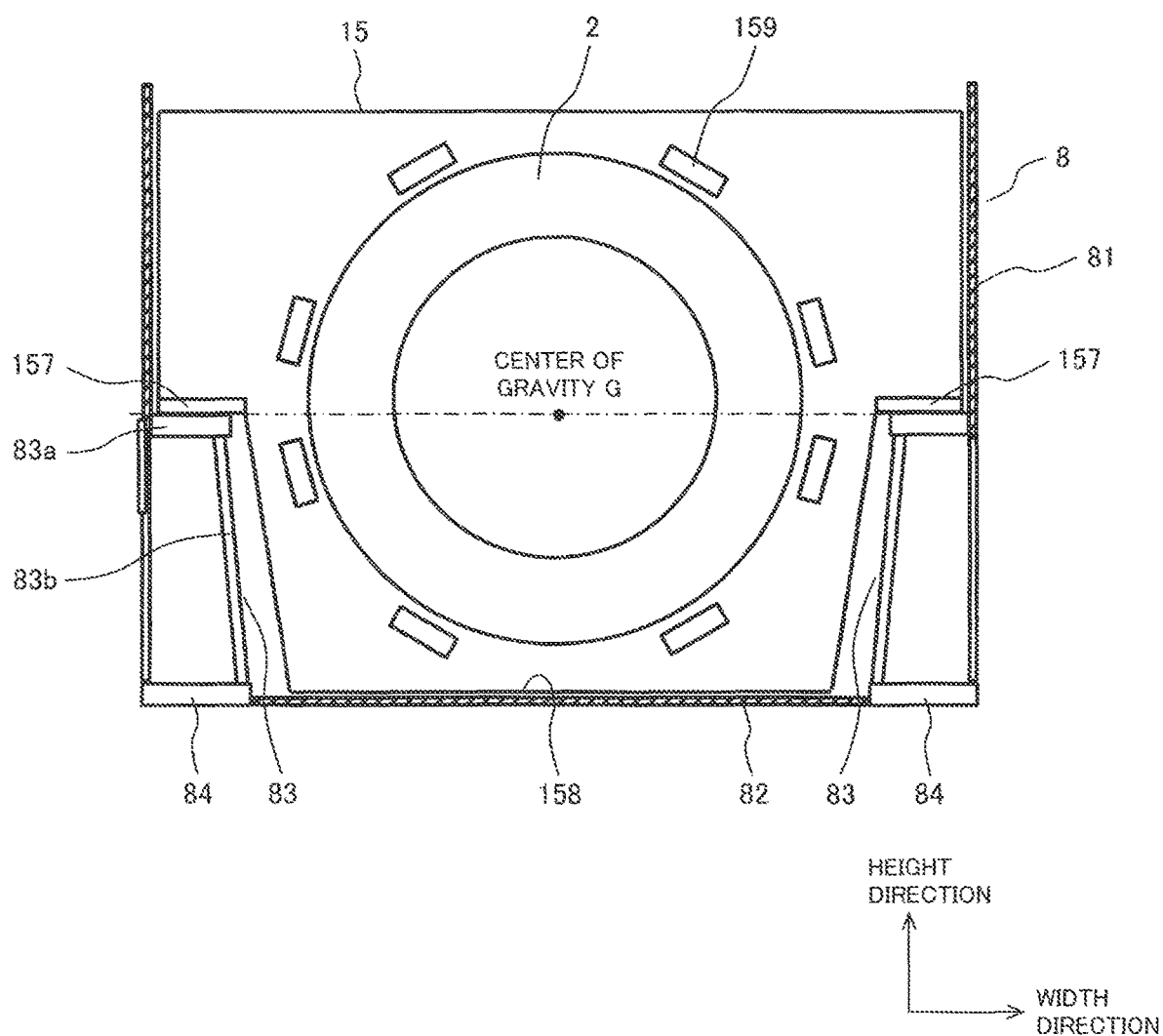
FIG. 7 is a diagram illustrating the stator frame and the intermediate frame fixed to the stator frame in a dynamo-electric machine according to embodiment 2 of the present invention.

FIG. 7 is a diagram illustrating the stator frame 8 and the intermediate frame 15 fixed to the stator frame 8, and is a cross-sectional view perpendicular to the axial direction of the stator frame 8 and the intermediate frame 15. The intermediate frame 15 supports the stator 2.

In the dynamo-electric machine 100 according to this embodiment, the upper surface 83*a* of each of the pedestals 83 is present at a higher position compared with the dynamo-electric machine 100 according to embodiment 1. The position in the height direction of the upper surface 83*a* is substantially the same as the position in the height direction of the center of gravity G of the stator 2 (that is, the position in the height direction of the center of the rotary shaft 10). With this configuration, in the dynamo-electric machine 100 according to this embodiment, as compared with the dynamo-electric machine 100 according to embodiment 1, the displacement of the intermediate frame 15 is smaller with respect to the vibration (in particular, the vibration in the width direction) of the stator 2, the vibration of the intermediate frame 15 is further inhibited, and the vibration of the stator frame 8 and the bearings 16 is further inhibited.

However, the following points are required to be noted. In the dynamo-electric machine 100 according to this embodiment, compared with the dynamo-electric machine 100 according to embodiment 1, since the upper surface 83*a* of each of the pedestals 83 is present at a higher position, the length of the stator frame 8 in the width direction is longer, and the mass of the stator frame 8 is increased. In addition, since the upper surface 83*a* of each of the pedestals 83 is present at a higher position, the pedestal 83 is required to be stronger, and the mass of the pedestal 83 is increased. Thus, in the dynamo-electric machine 100 according to this embodiment, compared with the dynamo-electric machine 100 according to embodiment 1, the mass is increased and the manufacturing cost can be increased.

As described above, each of the pedestals 83 can effectively inhibit the vibration when the intermediate frame 15 is fixed at a position close to the center of gravity G of the stator 2 (at a position close in the height direction). Therefore, to effectively inhibit the vibration and prevent an excessive increase in the mass of the stator frame 8, it is preferred that the position in the height direction of the upper surface 83*a* of each of the pedestals 83 is equal to or below the position in the height direction of the center of gravity G of the stator 2.

Further, elements of an embodiment may be added to another embodiment. Furthermore, some elements of each embodiment may be deleted, subjected to the addition of other elements, or replaced by other elements.

It should be noted that the present invention is not limited to the above embodiments, and various modifications can be made for the present invention. For example, the above embodiments describe the present invention in detail in order to facilitate the understanding of the present invention. The present invention is not limited to the embodiments including all the described elements. Some elements of the configuration of one of the embodiments can be replaced with the elements of the other embodiment. Further, elements of one of the embodiments can be added to the other embodiment. Furthermore, some elements of the configuration of each of the embodiments can be deleted, subjected to the addition of other elements, or replaced with other elements.

EXPLANATION OF REFERENCE CHARACTERS

1 . . . rotor,
2 . . . stator,
3 . . . air gap,
4, 4*a*, 4*b*, 4*c* . . . internal air,
5 . . . guide plate,
6 . . . stator core,
7 . . . axial flow fan,
8 . . . stator frame,
9 . . . stator coil end portion,
10 . . . rotary shaft,
12 . . . pipe group,
13 . . . external fan,
14 . . . external air,
15 . . . intermediate frame,
16 . . . bearing,
17 . . . bracket,
18 . . . partition plate,
81 . . . side plate,
82 . . . bottom plate, 83 . . . pedestal,
83a . . . upper surface,
83b . . . side surface,
84 . . . leg plate,
85 . . . bolt hole,
100 . . . dynamo-electric machine,
101 . . . dynamo-electric machine main body,
102 . . . heat exchanger,
103 . . . external fan duct,
151 . . . main plate,
152 . . . intermediate plate,
153 . . . intermediate plate,
154 . . . main plate,
155 . . . side plate,
156 . . . side plate,
157 . . . leg plate,
158 . . . bottom plate,
159 . . . opening portion,
160 . . . side plate,
200 . . . opening portion,
1551 . . . opening portion,
1552 . . . through hole.

What is claimed is:

1. A dynamo-electric machine comprising:
a stator;
a rotor including a rotary shaft and being disposed on an inner side in a radial direction of the stator;
a bearing for supporting the rotary shaft;
an intermediate frame for supporting the stator; and
a stator frame for supporting the bearing and the intermediate frame,
wherein the stator frame includes pedestals at two end portions in a width direction of a bottom portion of the stator frame,
wherein each of the pedestals includes an upper surface positioned above a bottom surface of the stator frame,
wherein the intermediate frame is fixed to upper surfaces of the pedestals,
wherein the intermediate frame includes main plates at two end portions in an axial direction of the intermediate frame, each of the main plates is a polygon including a first circular opening portion for supporting the stator, and a portion of each main plate contacts the stator, and
wherein each of the main plates includes a plurality of second opening portions disposed around a circumference of the first opening portion.

2. The dynamo-electric machine according to claim 1,
wherein the intermediate frame includes a bottom plate and leg plates in a bottom portion of the intermediate frame, the bottom plate being a surface positioned at a center portion in the width direction, and the leg plates being surfaces positioned at two end portions in the width direction and positioned above the bottom plate, and
wherein the leg plates of the intermediate frame are fixed to the upper surfaces of the pedestals.

3. The dynamo-electric machine according to claim 2,
wherein the bottom plate of the intermediate frame is not in contact with the bottom surface of the stator frame.

4. The dynamo-electric machine according to claim 1,
wherein a position in a height direction of the upper surface of each of the pedestals of the stator frame is equal to or below a position in the height direction at a center of the rotary shaft.

* * * * *